United States Patent [19]
Whitehead et al.

[11] Patent Number: 5,456,282
[45] Date of Patent: Oct. 10, 1995

[54] PRESSURE REDUCING REGULATOR

[75] Inventors: John C. Whitehead, Davis; Lemoyne W. Dilgard, Willits, both of Calif.

[73] Assignee: Regents of the University of California, Oakland, Calif.

[21] Appl. No.: 239,867

[22] Filed: May 9, 1994

[51] Int. Cl.$^6$ .................................................. G05D 16/02
[52] U.S. Cl. ............................. 137/505.13; 137/505.22
[58] Field of Search .................... 137/505.13, 505.22, 137/505.23, 505.25, 565

[56] References Cited

U.S. PATENT DOCUMENTS

| | | | |
|---|---|---|---|
| 1,406,011 | 2/1922 | Hinchman | 137/505.22 |
| 1,837,001 | 12/1931 | White | 137/505.23 |
| 2,339,753 | 1/1944 | Bloom | 137/505.23 X |
| 2,892,468 | 6/1959 | Beuchle | 137/505.13 |
| 4,898,205 | 2/1990 | Ross | 137/505.25 X |
| 4,922,955 | 5/1990 | Uri | 137/505.25 |
| 5,026,259 | 6/1991 | Whitehead et al. | 417/379 |
| 5,222,873 | 6/1993 | Whitehead et al. | 417/344 |

OTHER PUBLICATIONS

AIAA 92–3539, Demand Thrust Pumped Propulsion with Automatic Warm Gas Valving, J. C. Whitehead, 28th Joint Propulsion Conference and Exhibit, Jul. 6–8, 1992.

AIAA 93–2121, Bipropellant Propulsion with Reciprocating Pumps, J. C. Whithead, 29th Joint Propulsion Conference and Exhibit, Jun. 28–30, 1993.

Energy & Technology Review, published Jul. 1993, A New Rocket Propulsion System for Small Spacecraft, J. C. Whitehead, pp. 13–25.

Proceedings of Joint Army–Navy–NASA–Air Force Propulsion Meeting, Nov. 1993, J. C. Maybee et al., "Updated Test Results Of A Pumped Monopropellant Propulsion System".

*Primary Examiner*—Stephen M. Hepperle
*Attorney, Agent, or Firm*—Henry P. Sartorio; L. E. Carnahan

[57] ABSTRACT

A pressure reducing regulator that controls its downstream or outlet pressure to a fixed fraction of its upstream or inlet pressure. The regulator includes a housing which may be of a titanium alloy, within which is located a seal or gasket at the outlet end which may be made of annealed copper, a rod, and piston, each of which may be made of high density graphite. The regulator is insensitive to temperature by virtue of being without a spring or gas sealed behind a diaphragm, and provides a reference for a system in which it is being used. The rod and piston of the regulator are constructed, for example, to have a 1/20 ratio such that when the downstream pressure is less than 1/20 of the upstream pressure the regulator opens and when the downstream pressure exceeds 1/20 of the upstream pressure the regulator closes.

19 Claims, 5 Drawing Sheets

PRESSURE REDUCING REGULATOR

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

The present invention relates to pressure regulators, particularly to pressure regulators for tank pressurization, and more particularly to a pressure reducing regulator using a differential area piston arrangement with the outlet pressure referenced to a fraction of the inlet pressure.

Pressure regulators of various types have been developed for numerous applications. Pressure regulators typically use either a spring or a diaphragm pressurized by a sealed chamber to provide a reference pressure. However, the reference pressure would change with temperature, since springs can lose their temper when heated, and gas in a sealed chamber would exert more pressure on the diaphragm when heated.

In recent years substantial research and development have been directed to applications, such as propulsion systems, which utilize low propellant tank pressure to reduce the weight of the propellant tanks. Although the propellant tank pressure is low, a source of pressurant gas is required to maintain tank pressure as liquid is used, to expel the liquid at low pressure into the pumps which supply the propellant to the thrust chamber. Previous alternatives considered were (1) a small gas storage bottle with a cold gas regulator, (2) tank blowdown pressurization (e.g. fill the tank only ¾ full and start with 4 times the required pressure), or (3) a substance in liquid-vapor equilibrium which boils to keep the tank at operating pressure as liquid is used therefrom. The first alternative results in increased weight of the tank because high pressure gas storage requires heavier material to withstand the internal pressure. The second alternative uses the tank volume inefficiently and requires a higher pressure capability for the tank. With the third alternative, the tank pressure depends on its temperature, so that it may be over pressurized if it becomes too warm (e.g. temperature extremes during storage).

The above problems relative to lower pressure tanks, particularly low pressure propellant tanks, such as those utilized in U.S. Pat. No. 5,026,259 issued Jun. 25, 1991 to J. C. Whitehead et al., and No. 5,222,873 issued Jun. 29, 1993 to J. C. Whitehead et al., which utilize reciprocating pump-fed rocket propulsion systems, are solved by the present invention and thus enables the operation of the propellant tank at a much lower pressure than the thrust chamber, in order to achieve high performance by using lightweight tankage. The present invention solves the above problem by using a small amount of the high pressure, high temperature gas which is used to power the pumps on the propulsion system, such as those of the above-referenced U.S. Patents.

SUMMARY OF THE INVENTION

It is an object of the present invention to provide a pressure regulator which operates over a wide temperature range, while reducing the weight thereof.

A further object of the invention is to provide a pressure regulator which can be effectively utilized for low pressure supply tanks.

Another object of the invention is to provide a pressure reducing regulator with outlet pressure referenced to a fraction of the inlet pressure.

Another object of the invention is to provide a pressure regulator which uses a differential area piston arrangement so that the reference pressure for the outlet is effectively a constant fraction of the source pressure, and is capable of high temperature operation.

Another object of the invention is to provide a pressure reducing regulator which eliminates temperature sensitive parts, and provides an outlet pressure which is a fixed fraction of the source pressure.

Another object of the invention is to provide a pressure reducing regulator which is useful in pump-fed rocket propulsion systems for pressurizing the propellant tank to a small fraction of the combustion chamber pressure or gas generator pressure.

Other objects and advantages will become apparent from the following description and accompanying drawings. The invention involves a pressure reducing regulator which uses a differential area piston arrangement so that the reference pressure for the outlet is effectively a constant fraction of the source pressure, and it is capable of high temperature operation. The regulator has two moving parts and is constructed of thermally compatible materials to render it insensitive to temperature. Using the pressure regulator of this invention and given a source of gas at elevated temperature (e.g. 1200° F., for example) and a pressure (e.g. 1000 psi, for example), a lower pressure (e.g. 50 psi) is provided at a constant fraction of the source pressure (e.g. ¹⁄₂₀), over a wide range of downstream-demand-driven flow rates. This invention is particularly useful in applications such as pump-fed liquid propulsion systems, such as the rocket propulsion systems in above-referenced U.S. Pat. No. 5,026,259 and No. 5,222,873, for pressurizing the propellant tank to a small fraction of the combustion chamber pressure or gas generator pressure. The pressure regulator of this invention could be utilized in any pneumatic system (compressed air) or steam system which has a need for a variable flow at a constant fraction of the source pressure.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention is directed to a pressure reducing regulator with outlet pressure being referenced to a fraction of supply pressure. While pressure regulators are widely utilized, the present invention solves the problem of how to make a pressure regulator operate over a wide temperature range, while reducing the weight considerably. As pointed out above, prior regulators typically use either a spring or a diaphragm pressurized by a sealed chamber to provide a reference pressure. However, the reference pressure would change with temperature. The present invention eliminates these temperature sensitive parts, which also reduces weight. It should be noted, however, that the pressure regulator of this invention does not have an absolute pressure reference, but instead provides an output pressure which is a fixed fraction of the source pressure.

Figure 1:
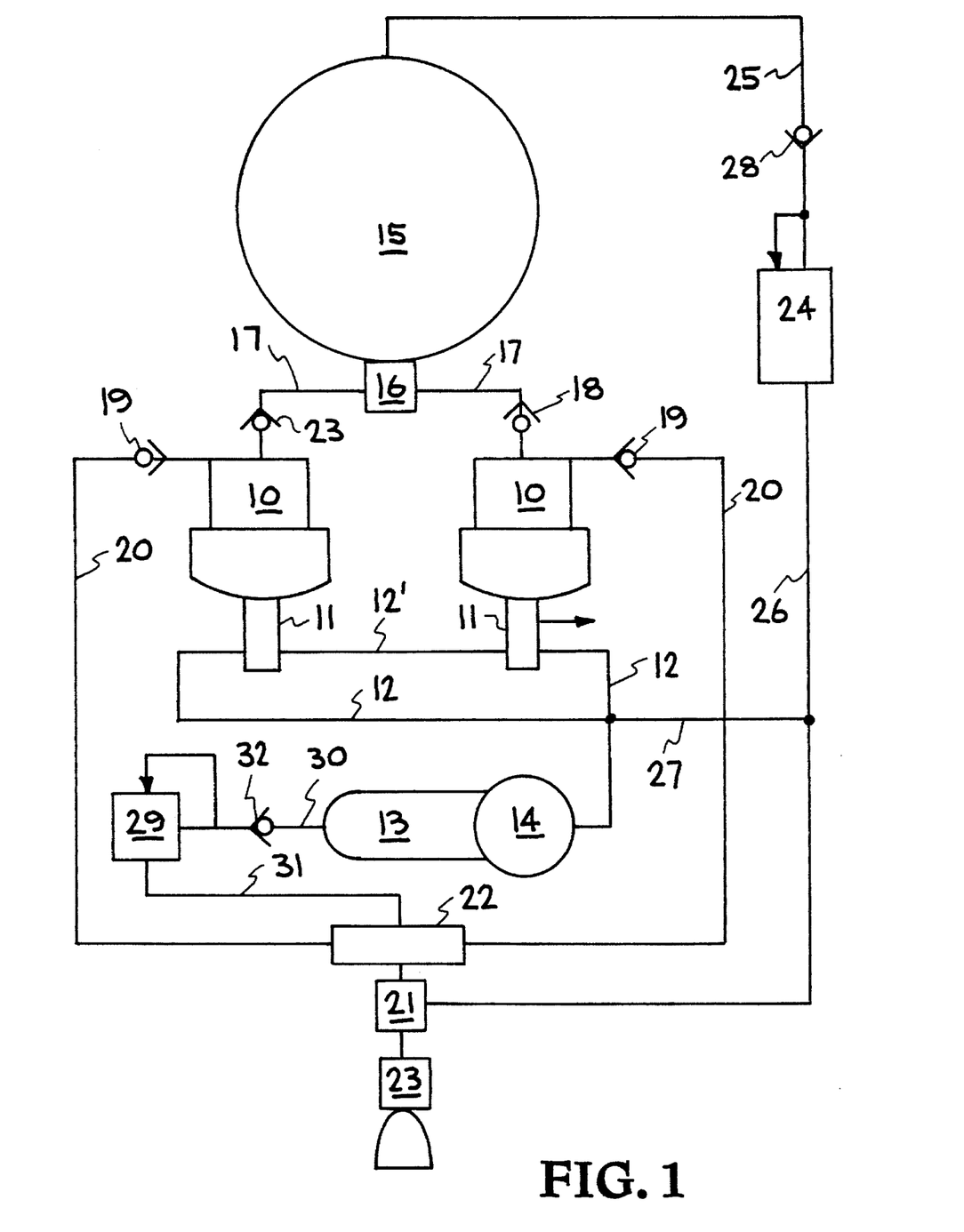
FIG. 1 schematically illustrates a propulsion system utilizing a free-piston pump/control valve arrangement which incorporates the pressure reducing regulator of this invention.

While the pressure reducing regulator of this invention has application in various systems which has a need for a variable flow at a constant or fixed fraction of the source pressure, it has particular application in systems involving pressurizing a propellant tank to a small fraction of the chamber pressure or gas generator pressure, as in the propulsion systems of the above-referenced U.S. Patents. The invention is broadly illustrated in FIG. 1 and described hereinafter in an application in a pump-fed rocket propulsion system, but such is not intended to limit the invention to this type of application. While the application of the invention illustrated in FIG. 1 is directed to a monopropellant liquid propulsion system using a pair of pump/control valve assemblies, it may be utilized in bipropellant liquid propulsion systems using two or more pairs of pump/control valve assemblies, such as described in above-referenced U.S. Pat. No. 5,222,873, and paper AIAA 92-3539 by J. C. Whitehead entitled *"Demand Thrust Pumped Propulsion With Automatic Warm Gas Valving"*, 28th Joint Propulsion Conference and Exhibit, Jul. 6–8, 1992.

Referring now to FIG. 1, which illustrates a free-piston pumped monopropellant demand-thrust propulsion system which uses a warm gas directed into gas cylinder sections of pump assemblies 10 via gas intake/exhaust valve assembly 11 and supply lines or tubes 12, which is generated by a gas or fluid generator or high pressure fluid supply 13 having a storage plenum 14 connected to warm gas supply lines 12. A signal line 12' interconnects valve assemblies 11. The propulsion liquid fuel (hydrazine) is stored in a low pressure, light weight spherical tank 15 which is connected via an enable valve 16 to liquid inlet tubes or lines 17 connected to pump assemblies 10. The liquid fuel from tank 15 is adapted to flow via alternately activated check valves 18 into liquid cylinder sections of either the left or the right pump assembly 10 when the gas cylinder section of the pumps is being exhausted, as indicated by the arrow. While not shown in detail the free-piston pump assemblies 10 and the valve assemblies 11 may be of the type described and illustrated in above-reference U.S. Pat. No. 5,222,873 or in copending U.S. application Ser. No. 08/081,695 filed Jun. 25, 1993 entitled *"Valving For Controlling A Fluid-Driven Reciprocating Apparatus"* in the name of J. C. Whitehead and assigned to the same assignee. As the gas cylinder section of a pump assembly 10 is stroked (differential free-piston moves upwardly) the liquid fuel is pressurized and forced from the liquid cylinder section of pump assembly 10 via a check valve 19 into liquid outlet tube or line 20 connected to a thrust control valve 21 via a filter 22 and the liquid fuel is then reacted in a thrust chamber 23. A pressure reducing regulator, generally indicated at 24 is connected at one end (outlet) via a line or tube 25 to liquid fuel tank 15 and is connected at the other end (inlet) via a line or tube 26 to thrust control valve 21, with line 26 being also connected to warm gas supply lines 12 via a line or tube 27. A check valve 28 is located in line 25 to prevent flow from tank 15 to pressure regulator 24.

Figure 2:
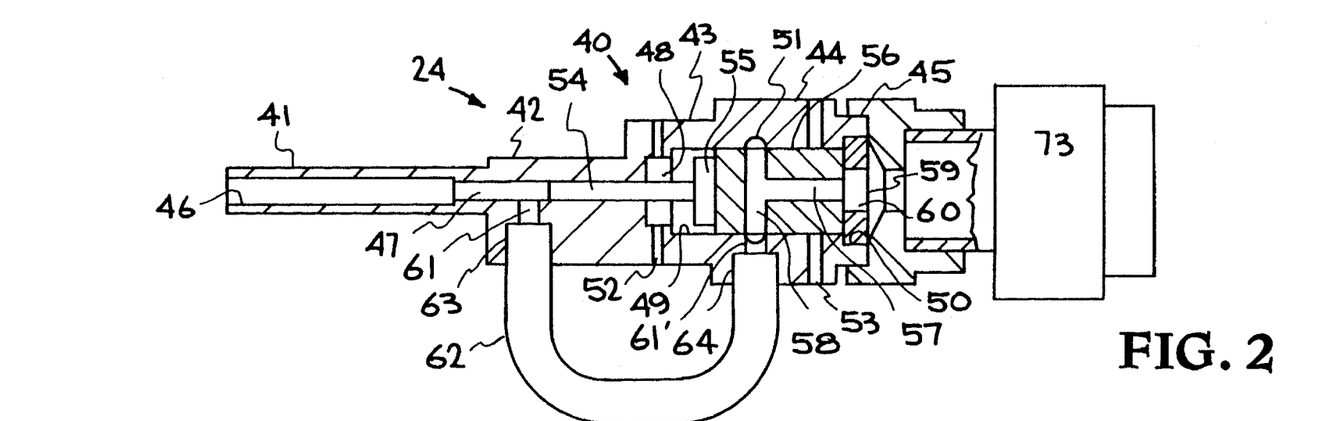
FIG. 2 is a cross-sectional view of an embodiment of the invention with one end connector and showing the valving piece in its open position which allows gas flow through the bypass tube, left to right as shown.
Figure 3:
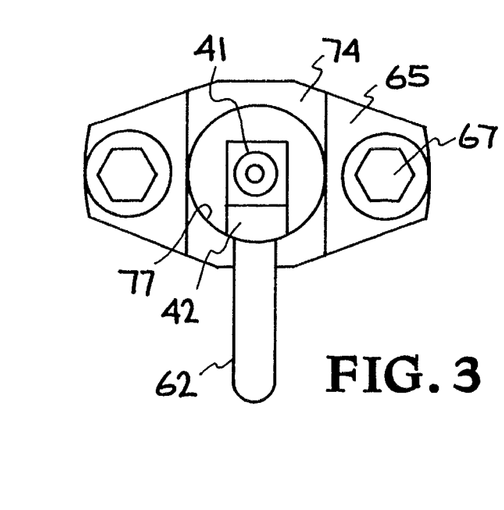
FIG. 3 is an end view of the FIG. 2 embodiment.
Figure 6:
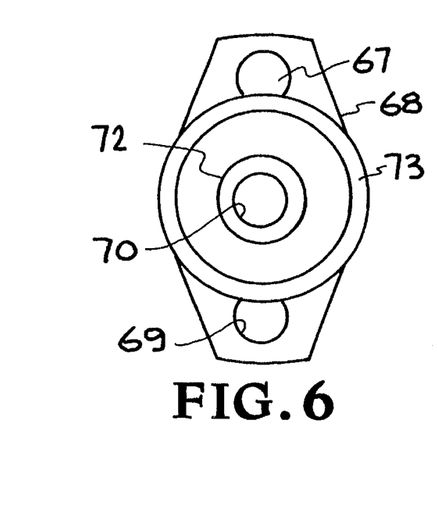
Figure 7:
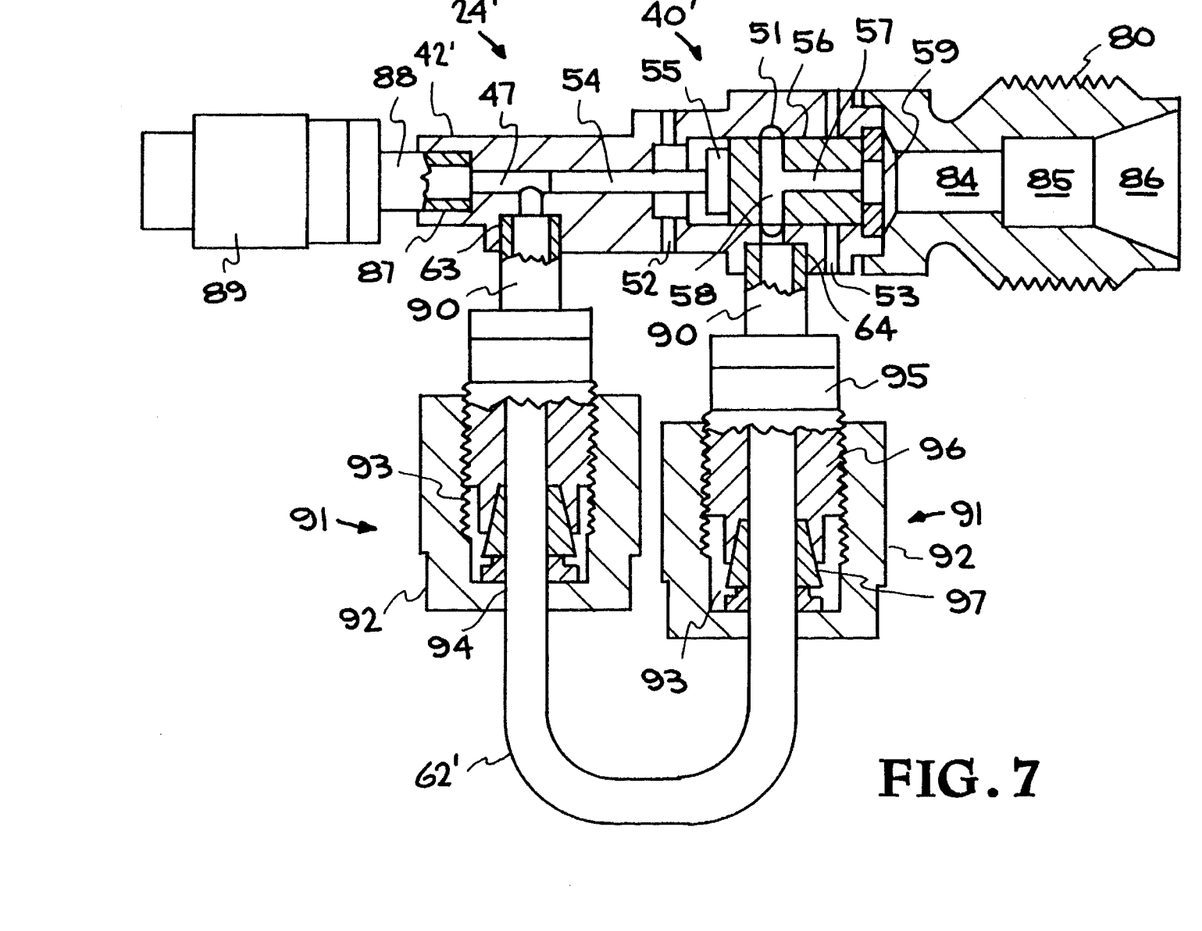
FIG. 7 is a cross-sectional view of the pressure regulator of FIG. 2 but illustrating different end connectors and bypass tube arrangement, and showing the valving piece in open position.
Figure 8:
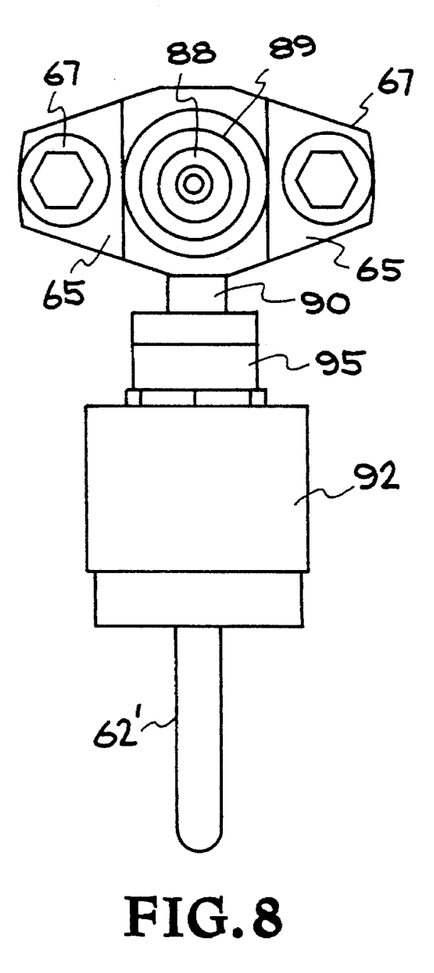
FIGS. 8 and 9 are end views of the FIG. 7 embodiment.
Figure 9:
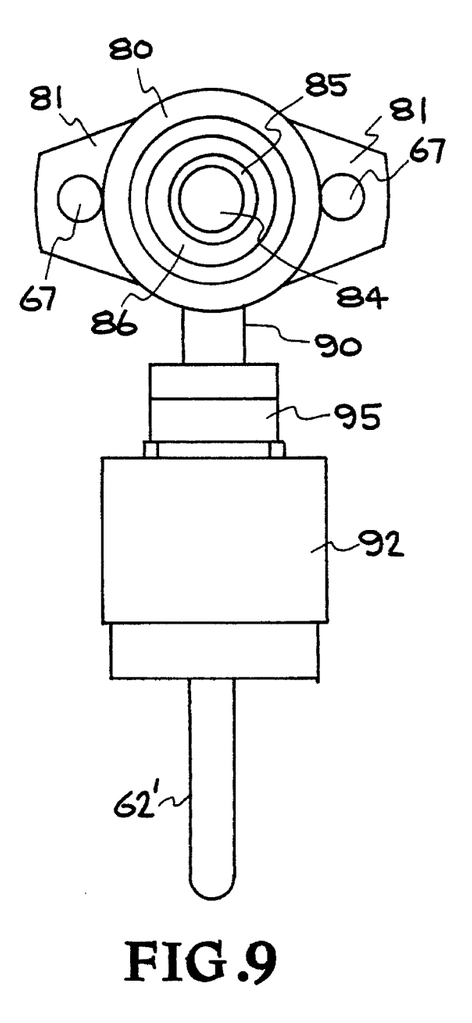

Pressure reducing regulator 24 is of a bypass type as shown in FIGS. 2-10 wherein warm fluid or gas from generator 62 is directed via lines 12, 27, 26 and 25 into fuel tank 15 when the valving piece of regulator 24 is in open position as illustrated in FIGS. 2 and 7, as described hereinafter. The warm gas from line 12 is also directed to thrust control valve 21 via lines 27 and 26, whereby the pressure of the warm gas in line 26 is directed onto the pressure regulator 24 and thrust control valve 21. A control valve or liquid regulator 29 is connected to gas generator 13 and to the filter 22 via lines or tubes 30 and 31, with a check valve 32 being located in line 30, whereby a controlled amount of liquid fuel is fed into gas generator 13.

Referring now to the embodiments of the invention illustrated in FIGS. 2–6 and 7–10, the main components of the pressure reducing regulator (housing and movable members therein) are the same in each embodiment but contain a different bypass arrangement and couplings connected to the inlet and outlet ends. In each of the embodiments the gas or fluid flow is from left to right as illustrated and indicated by arrows in FIGS. 2 and 7 which corresponds with a gas flow in FIG. 1 from line 26 through pressure regulator 24 to line 25 and into the liquid fuel tank 15 to pressurize the fuel therein.

In a system such as illustrated in FIG. 1, tank pressurization is of significant importance to enable the use of low pressure, light weight tanks 10 for retaining the propellant. In the system of FIG. 1, for example, which utilizes the pressure reducing regulator 24 of this invention, tank pressurization is accomplished by starting a mission with inert gas bubbles in the tank 15 and then feeding a small fraction of the pump-drive gas produced by generator 13 into the tank 15 through the warm gas regulator 24. Note the low pressure tanks require a low mass of pressurizing gas, so the total amount of heat carried to the tank is much less than if warm gas is similarly used in a pressure-fed propulsion system. The warm gas from generator 13 will lose more than half of its absolute temperature as it expands through the regulator 24, so that tank heating is much less a concern using the present invention. The operating pressure upstream of the warm gas regulator (in line 26) is constant enough that it can be used as a reference for the regulator 24, by employing a differential area valve spool or valving piece in lieu of a valve biased by a spring or a dome-loaded diaphragm.

FIGS. 2 and 7 illustrate embodiments of the warm gas pressure reducing regulator that controls its downstream or outlet pressure (right end) to a fixed fraction of its upstream or inlet pressure (left end). As seen in FIGS. 2–6 the regulator, indicated generally at 24, comprises a housing generally indicated at 40 having a plurality of different external cross-sections indicated at 41, 42, 43, 44, and 45 and an internal passageway or bore having a plurality of different cross-sections indicated at 46, 47, 48, 49 and 50. In addition, housing 40 is provided with an internal groove 51 located in passageway section 49 of housing section 44, a plurality of opening 52 extending radially from passageway section 48 through housing section 43, and a plurality of openings 53 extending radially from passageway section 49 through housing section 44. Located within the internal passageway of housing 40 is a push rod or member 54 having an enlarged head section 55 and a valving piece or movable piston 56 having a central opening 57 extending partially therethrough and a plurality of openings 58 extending radially outward from an inner end of central opening 57. Said push rod 54 and piston 56 constitute a differential area piston arrangement. Push rod 54 is located in passageway sections 47, 48 and 49, with valving piece 56 being located within passageway section 49. A gasket 59 having a central opening 60 is located in passageway section 50 of housing section 45. Housing 40 also includes radially extending openings 61 and 61' in housing sections 42 and 44 which interconnects passageway sections 47 and 49 with a bypass tube, line or hollow member 62 mounted in counter sinks 63 and 64 in housing sections 42 and 44 such that groove 51 and radial openings 58 provide fluid communication between the central opening 57 in valving piece 56 and passageway section 47 of housing section 42, whereby gas from line 26 in FIG. 1 flows from the inlet end of housing 40 through the bypass tube 62 to the outlet end of housing 40 and into line 25 of FIG. 1, as indicated by the flow arrows in FIG. 2.

Figure 4:
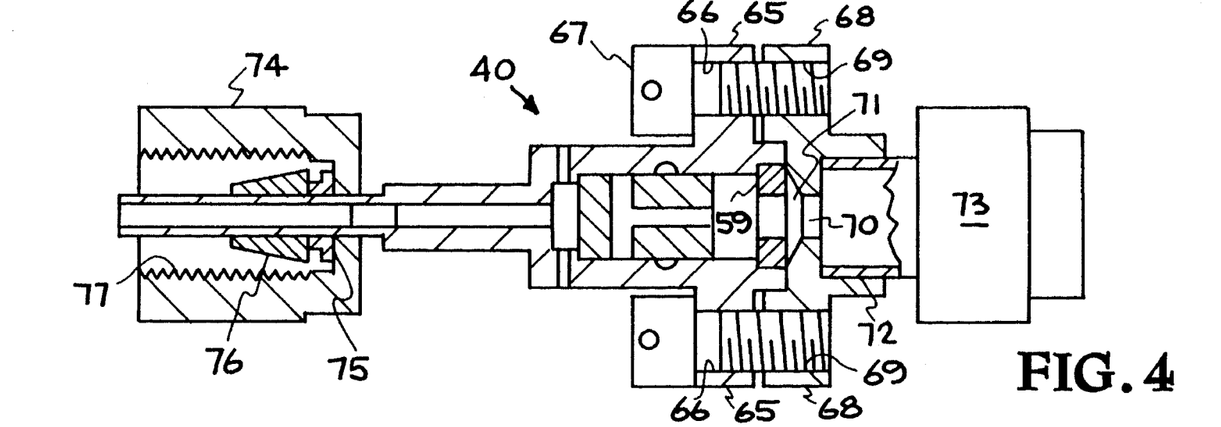
FIG. 4 is a cross-sectional view of the FIG. 2 embodiment rotated 90° with two end connectors and showing the valving piece in its closed position.
Figure 5:
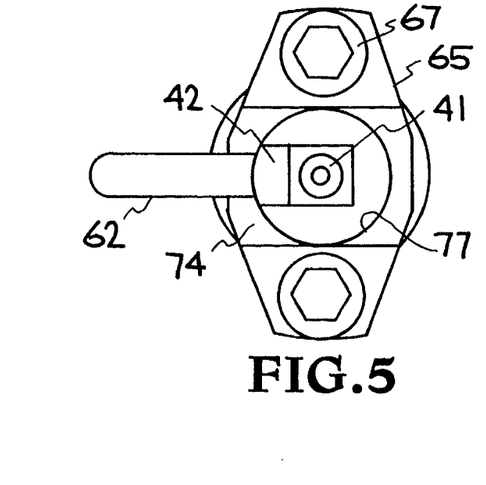
FIGS. 5 and 6 are end views of FIG. 4, with FIG. 5 taken along the line 5—5 of FIG. 4.

As seen in FIG. 4 and 6, housing section 44 also includes a pair of protruding members 65 having openings 66 through which bolts or screws 67 extend and are threadedly connected to a coupler or member 68 having threaded openings 69 thereon. Coupler 68 is configured to retain gasket 59 in housing section 45, and include a central opening 70 having an enlarged tapered inner section 71 and an enlarged counter-sink section 72 in which an outlet coupling 73 is secured for connection to line 25 of the FIG. 1 system.

As seen in FIG. 4, an inlet coupler 74 is mounted around housing section 41 via a front ferrule 75 and a tapered back ferrule 76 located within a threaded countersink 77 in coupler 74 for connection to line 25 of the FIG. 1 system. By way of example, the housing 40 is constructed of titanium or a titanium alloy, such as titanium-aluminum-vanadium (Ti-6% Al-4%V), but may be constructed of Ti-6242 manufactured by Timet Co., or other material which is compatible with required operating conditions. The push rod 54 and valving piece or piston 56 are constructed of high density graphite, approximately 1.8 grams/cc, but may be constructed of other material which is compatible with required operating conditions. The gasket 59 is constructed of copper, a copper alloy, or other compatible material which is soft enough to serve as a gasket. Also, by way of example, the push rod 54 which moves in the bore or passageway section 47 has a 0.7 mm diameter with the head section 55 thereof have a diameter of 2 mm, and the valving piece or piston 56 has a diameter of 3.2 mm, which results in a 1/20 pressure ratio. However, the rod 54 and piston 56 may be constructed to produce a different pressure ratio.

As seen in FIGS. 2 and 4 the area around the push rod 54 in passageway or bore sections 48 and 49 constitute a variable-volume space and is externally vented via radial openings 52. Therefore, whenever upstream (line 26) pressure exceeds 20 times the downstream (line 25) pressure, the internal parts (push rod 54 and piston 56) will be pushed against the right end of the bore or passageway in housing 44, as shown in FIG. 2, which fully opens the flow from line 26 to line 25 through bypass tube 62. During nominal operation the push rod 54 and valving piece or piston 56 move slightly to the left of the full open position shown in FIG. 2, which partially restricts the flow from housing 40 through the openings 57 and 58 in valving piece or piston 56. This provides the required equivalent orifice area to meet downstream flow demand at the correct pressure ratio. In the event that the downstream pressure becomes excessive, the valve elements (rod 54 and piston 56) move to the extreme left end of the bore or passageway of housing 40, which exposes the downstream end or outlet of the regulator to the radial or vent holes 53 in housing section 44 and push rod 54 blocks opening 61 to bypass tube 62, as shown in FIG. 4, and terminates flow from line 26 in line 25 of FIG. 1. Some leakage during nominal operation of the regulator 24 will occur, which increases with clearances between the valving elements (push rod 54 and piston 56) and the surface of the bore or passageway in housing 40, because materials which withstand elevated temperatures cannot provide leak-tight seals. By the use of the housing 40 formed from titanium or titanium alloy and the valving elements (push rod 54 and piston 56) formed from graphite, leakage is minimized because these materials have an acceptably low difference in thermal expansion, and graphite requires no liquid lubrication. Test of the pressure reducing regulator have demonstrated that if friction or leakage is excessive, the regulator can oscillate. However, the desired stable operation has been demonstrated with helium at 6 MPa electrically heated to 675° C. (1250° F.). In addition, a warm gas regulator as described herein, operated on decomposed hydrazine products, maintained pressure in a rocket tank during a successful flight test. The regulator has a mass of 2 grams without fittings, and delivers gas at 50 psi with a supply at 1000 psi at any temperature up to about 1200° F. The downstream pressure is constant with flow rates from 0 to 2 standard liters per second. The test results and use of the regulator of this invention in rocket propulsion systems are set forth in greater detail in paper AIAA 93-2121 entitled "*Bipropellant Propulsion With Reciprocating Pumps*" by J. C. Whitehead, 29th Joint Propulsion Conference and Exhibit, Jun. 28–30, 1993; Energy and Technology, "*A New Rocket Propulsion System for Small Spacecraft*" pages 13–25, bearing a date of March 1993, but published in July 1993 by the University of California, Lawrence Livermore National Laboratory; and "*Updated Test Results Of A Pumped Monopropellant Propulsion System*", Proceedings of Joint Army-Navy-NASA-Air Force Propulsion Meeting, November 1993.

The embodiment of the pressure reducing regulator illustrated in FIGS. 7–10 is essentially identical to that of the embodiment of FIGS. 2–6, the differences being in inlet end of housing 40, the inlet and outlet coupling mechanisms, and the bypass tube construction. Thus, each of the components of FIGS. 7–10 will be given corresponding reference numerals to those of FIGS. 2–6, and only the differing components will be hereinafter described.

Figure 10:
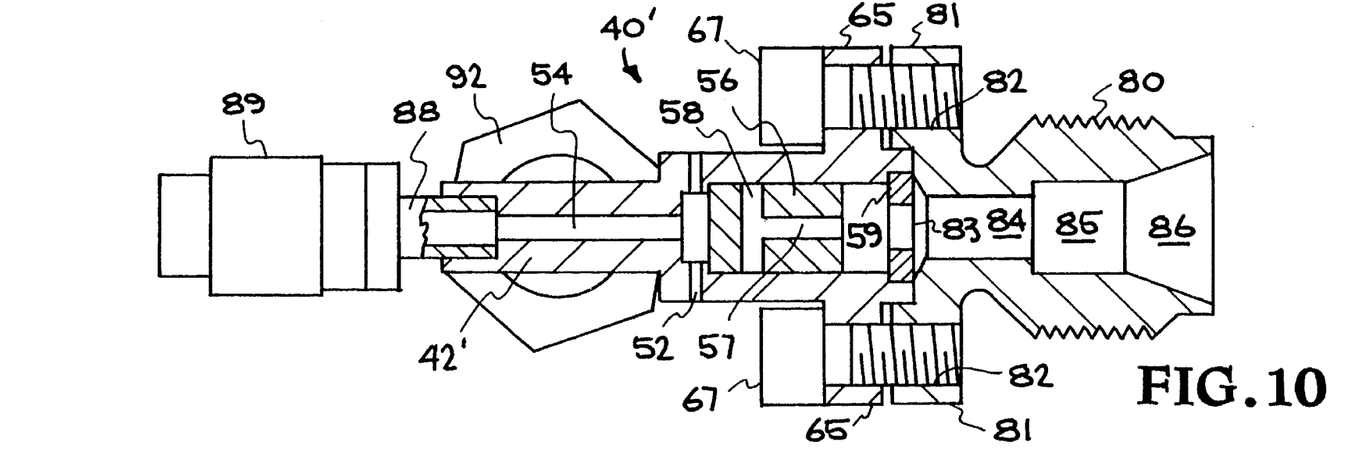
FIG. 10 is a cross-sectional view of FIG. 7 rotated 90° and showing the valving piece in closed position.

As seen in FIGS. 7 and 10, the pressure reducing regulator 24' utilizes an outlet coupling 80 which integrates the coupler 68 and coupling 73 of the FIGS. 2–6 embodiment. Coupling 80 is provided with protruding sections 81 having threaded apertures 82 therein which align with sections 65 of housing 40' through which bolts 67 extend and are threaded into apertures 82. Coupling 80 has a central bore composed of a tapered section 83, a first diameter section 84, a second but larger diameter section 85 and a flaring or outwardly tapering section 86 to which line 25 of the FIG. 1 system may be attached.

Housing 40' of the FIGS. 7–10 embodiment differs in that the smaller cross-section 41 of FIG. 2 is omitted and the bore or passageway of housing 40' includes an enlarged cross-section or counter-sink indicated at 87 in housing section 42' into which extends a hollow member 88 of an inlet 10 coupler 89 to which line 25 of the FIG. 1 system may be attached. Attached to housing 40' at counter-sinks 63 and 64 are hollow members or tubes 90 of a pair of bypass tube coupling mechanisms generally indicated at 91 in each of which is secured an end of a bypass tube 62'. Coupling mechanisms 91 each include a nut or cap 92 having an internally threaded section 93 and an opening 94 through which bypass tube 62' extends. Nut 92 is threaded onto a body member 95 of mechanism 91. Located within the section 93 of nut 92 and around ends of bypass tube 62' are a front ferrule 96 and a tapered back ferrule 97, with front ferrule 96 including a tapered end section which cooperates with the tapered back ferrule. As nut 92 is threaded onto member 95 the tapered back ferrule 97 is moved toward front ferrule 96 producing a seal around the end of bypass tube 62'.

It has thus been shown that the present invention provides a pressure reducing regulator which uses a differential area valving arrangement so that the reference pressure for the outlet is effectively a constant fraction of the source pressure, includes only two moving parts, and is constructed of materials capable of high temperature operation. By the elimination of conventional springs and pressurized diaphragms, the regulator can be constructed of very light-weight materials which can operate over a wide temperature range. When utilized in a system requiring a low pressure liquid, such as in a liquid fuel propulsion system, gas under pressure supplied to the low pressure fuel tank is regulated to a lower pressure than that used in other portions of the system (e.g. 1/20 ratio), and is then fed into the fuel tank at a constant pressure, at any required flow rate. The regulator is constructed of light-weight materials and thus weights very little more than a similar length of its associated tubing.

While specific embodiments, materials, parameters, and applications have been described and/or illustrated to set forth an understanding of the invention, such is not intended to be limiting. Modifications and changes will become apparent to those skilled in the art, and it is intended that the invention be limited only by the scope of the appended claims.

We claim:

1. A pressure regulator having an output pressure that is a fixed fraction of an inlet pressure, comprising:

a housing having a central opening therein and at least two axially spaced radially extending openings in communication with said central opening;

said central opening having a plurality of sections of different cross-section;

a first member being located in at least two of said sections of said central opening;

a second member being located in one of said sections of said central opening and in contact with said first member;

said second member having a cross-section substantially greater than a cross-section of an end of said first member to define a differential area piston arrangement;

means interconnecting said at least two axially spaced radially extending openings;

whereby when a pressure ratio of pressure on said second member relative to pressure on said one end of said first member is below a fixed amount, fluid passes from one of said two axially spaced radially extending openings, through said interconnecting means, and through another of said two axially spaced radially extending openings, and when a pressure ratio is changed from said fixed amount, said first and second members move to reduce or block fluid flow through said interconnecting means.

2. The pressure regulator of claim 1, additionally including at least two axially spaced vent openings in said housing and located on opposite sides of one of said two axially spaced radially extending openings.

3. The pressure regulator of claim 2, additionally including a groove extending around said central opening of said housing and in contact with one of said two axially spaced radially extending openings.

4. The pressure regulator of claim 3, wherein said second member is provided with an axially extending opening and a plurality of radially extending openings in communication with said axially extending opening, whereby said radially extending openings in said second member are adapted to be in communication with one of said two axially spaced radially extending openings in said housing when said pressure on said second member is below a fixed amount so that fluid passing through said interconnecting means passes through said radially extending and axially extending openings in said second member.

5. The pressure regulator of claim 4, additionally including a gasket means located in said housing and adjacent said second means.

6. The pressure regulator of claim 5, wherein said housing is constructed of material selected from the group of titanium and titanium alloys, and wherein said first and second members are constructed of graphite.

7. The pressure regulator of claim 6, wherein said gasket is constructed of material selected from the group of copper and copper alloys.

8. The pressure regulator of claim 1, in combination with a tank containing a liquid material under low pressure, and a source of higher pressure fluid, whereby said one of said two axially spaced radially extending openings is adapted to be in fluid communication with said source of higher pressure fluid and said another of said two axially spaced radially extending openings is adapted to be in fluid communication with said tank for maintaining a constant pressure in said tank.

9. The combination of claim 8, wherein said tank contains low pressure liquid fuel, and wherein said source of higher pressure fluid is a hot gas generator.

10. The combination of claim 9, wherein said tank and said hot gas generator are operatively connected to a pumping and valving mechanism for supplying liquid fuel to a propulsion system.

11. In a propulsion system using at least liquid fuel, at least one fluid-driven pump for supplying the liquid fuel to a propulsion chamber, and valve assemblies operatively connected to a high pressure fluid supply for controlling the fluid-driven pump, the improvement comprising:

a pressure reducing regulator connected between said high pressure fluid supply and at least one tank containing at least said liquid fuel;

said pressure reducing regulator including a housing having a differential area piston arrangement therein positioned solely by fluid pressure thereon, whereby a reference fluid pressure for an outlet section of said regulator connected to said tank is effectively a constant fraction of an inlet section of said regulator connected to said high pressure fluid supply, said pressure reducing regulator also including a fluid bypass line operatively connected to said housing and through-which fluid from said supply is adapted to flow to said tank when said differential area piston arrangement is positioned in one location in said housing and flow is reduced or blocked when said differential area piston arrangement is in different locations in said housing.

12. The improvement of claim 11, wherein said differential area piston arrangement comprises a push rod and a piston, said piston having a cross-section greater than a cross-section of said push rod, and wherein one end of said push rod is in fluid communication with said high pressure fluid supply and one end of said piston is in fluid communication with said tank.

13. The improvement of claim 12, wherein said housing is constructed from material selected from the group of titanium, titanium alloys, titanium-aluminum-vanadium, and wherein said push rod and said piston are constructed from graphite.

14. The improvement of claim 13, additionally including a gasket located in said housing and adjacent said piston.

15. A pressure reducing regulator for a gas with an outlet pressure referenced to a fraction of a supply pressure, comprising:

a housing having a bore extending axially therethrough, said bore including a plurality of sections of different cross-section;

a first movable member positioned in said bore of said housing;

a second movable member positioned in said bore of said housing and adapted to contact said first movable member, said second movable member having a cross-section greater than said first movable member;

at least one radially extending opening in said housing in communication with a first of said plurality of sections of said bore;

at least one radially extending opening in said housing in communication with a second of said plurality of sections of said bore;

a hollow member interconnecting said radially extending openings; and at least one vent opening in communication with said bore of said housing and located on one side of one of said radially extending openings;

whereby pressure applied against said first and second movable members causes same to move with respect to said radially extending openings for controlling passage of a gas through said hollow member.

16. The regulator of claim 15, wherein said housing includes a groove in said second of said plurality of sections of said bore, second movable member is provided with an axially extending opening and a plurality of radially extending openings, whereby movement of said second movable member causes said plurality of radially extending openings therein to provide or prevent fluid communication with said groove in said bore and said hollow member.

17. The regulator of claim 16, wherein said first movable member comprises a body section and an enlarged head section, said head section being in contact with said second movable member.

18. The regulator of claim 17, additionally including a gasket means located in said bore of said housing and adjacent said second movable member, and means for retaining said gasket means in said housing.

19. The regulator of claim 15, wherein said housing is constructed of material selected from the group consisting of titanium, titanium alloys, and titanium-aluminum-vanadium, and wherein said first and second movable members are constructed of material selected from the group consisting of graphite and other material compatible with the operating conditions.

* * * * *